United States Patent [19]

Skotheim

[11] Patent Number: 4,544,456
[45] Date of Patent: Oct. 1, 1985

[54] METHOD OF SYNTHESIZING POLYMERS FROM A SOLID ELECTROLYTE

[75] Inventor: Terje A. Skotheim, East Patchogue, N.Y.

[73] Assignee: The United States of America as represented by the United States Department of Energy, Washington, D.C.

[21] Appl. No.: 662,657

[22] Filed: Oct. 19, 1984

[51] Int. Cl.⁴ ............................................. C25C 3/00
[52] U.S. Cl. .............................. 204/59 R; 204/290 R; 427/12; 427/255.6; 429/111
[58] Field of Search .................. 204/59 R, 72, 78; 427/12, 82, 255.6

[56] References Cited

U.S. PATENT DOCUMENTS 3,574,072  4/1971  Louvar ................................. 204/72
4,197,171  4/1980  Dunn .................................... 204/16
4,401,545  8/1983  Naarmann ........................... 204/291

OTHER PUBLICATIONS

Skotheim, "Solid Polymer Electrolyte Photovoltaic Cell", J. Elect. Soc., 129: 894 (1982).
Skotheim, "Polypyrrole Electrodes . . . ", J. De Physique Collog., C3: 615 (1983).
Skotheim, "Solid Polymer Electrolyte Photoelectro Chemical Cells", BNL-34668 (1982).
Skotheim, "A Tandem Photovoltaic Cell . . . ", Appl. Physics Letter, 38: 712 (1981).

Primary Examiner—John F. Niebling
Attorney, Agent, or Firm—Vale P. Myles; James W. Weinberger; Judson R. Hightower

[57] ABSTRACT

A method of synthesizing electrically conductive polymers from a solvent-free solid polymer electrolyte wherein an assembly of a substrate having an electrode thereon, a thin coating of solid electrolyte including a solution of PEO complexed with an alkali salt, and a thin transparent noble metal electrode are disposed in an evacuated chamber into which a selected monomer vapor is introduced while an electric potential is applied across the solid electrolyte to hold the thin transparent electrode at a positive potential relative to the electrode on the substrate, whereby a highly conductive polymer film is grown on the transparent electrode between it and the solid electrolyte.

14 Claims, 5 Drawing Figures

METHOD OF SYNTHESIZING POLYMERS FROM A SOLID ELECTROLYTE

The U.S. Government has rights in this invention pursuant to Contract Number DE-AC02-76CH00016, between the U.S. Department of Energy and Associated Universities Inc.

BACKGROUND OF THE INVENTION

The invention relates to a method for synthesizing highly electrically conductive polymers, such as polypyrroles, polythiophene, etc., electrochemically from a solvent free solid polymer electrolyte based on poly(ethylene oxide) (PEO), complexed with at least one alkali metal salt. More particularly, the invention relates to a method for synthesizing an electrically conductive polymer from a solvent-free solid polymer electrolyte which is disposed in a vacuum chamber into which monomer vapor is introduced while a predetermined electric potential is maintained across the electrolyte.

Due to their advantages of simplicity and ease of fabrication, semiconductor-electrolyte junctions have been produced by a number of innovative concepts that are designed to improve their stability and efficiency. A novel approach to the problem of stability of semiconductor electrodes has been the introduction of thin film solid polymer electrolytes. PEO based solid polymer electrolytes are of interest both for photoelectrochemical energy conversion (PEC) devices and for all solid state batteries. An advantage of such solid polymer electrolytes in PEC devices is that their inherent absence of solvent results in an absence of photocorrosion of the electrodes in the devices. In fact, it appears that the cells of such devices are stable indefinitely when care is taken to eliminate water from the solid electrolyte by suitably heating it under vacuum.

One of the problems encountered in the manufacture of such PEC devices is that they require the use of electrically conductive polymer films of about 1000 angstroms or less in thickness. It is difficult to handle such very thin films to fabricate the sandwich type cell structures used in making prior art PEC device. Thus, it would be desirable to minimize or avoid such handling by forming the thin polymer films in situ on either a metal or semiconductor electrode.

One suitable method for forming such a thin film polymer on an electrode is described in an article published by Skotheim, et al. in the *Journal of the Electrochemical Society*, Vol. 129, p. 894 (1982), entitled "Solid Polymer Electrolyte Photovoltaic Cell". The method described in that article involves forming a photoelectrochemical cell based on PEO-KI/I$_2$ electrolytes, n-Si/Pt/polypyrrole photoanodes and conductive tin-oxide glass counter electrodes. The PEO-KI/I$_2$ films in the cell were made on a conductive glass electrode by evaporation from a methanol solution at room temperature. The PEO had a molecular weight of 600,000 (Aldrich) and the concentration of potassium, as given by the stoichiometric ratio of alkali metal cations to oxygen atoms in the polymer backbone was $\frac{1}{8}$.

The advantages of the method disclosed herein, relative to such prior art methods, would be at least twofold: (1) by synthesizing the polypyrrole, or other electrically conducting polymer, in situ in the finished assembly one eliminates all mechanical handling of the thin films. Sometimes, if the films are intended as electronic coupling materials between electrodes and PEO electrolytes the films are so thin, e.g. about 100 Angstroms thick, that they simply cannot be handled mechanically. For optimum performance, an in situ polymerization with a PEO electrolyte can, therefore, mean the difference between practical and non-practical efficiencies in the case of such photoelectrochemical cells. (2) for other than thin film devices; by growing a film in situ one also achieves a better mechanical contact between the polypyrrole and the PEO. If the films are handled mechanically and pressed together, heating is sometimes required to a sufficiently high temperature to cause bonding to occur, and such heating of the assembly can damage it or the adjacent materials.

Accordingly, a major object of the present invention is to provide a method for forming an electrically conductive polymer film from a solvent-free solid polymer electrolyte by depositing the film directly on an ultra thin electrode that is evaporated, or otherwise deposited, onto the solid electrolyte.

Another object of the invention is to provide a method for synthesizing an electrically conductive polymer film from a solid PEO salt coating that is about 1 micron thick and that has a thin film electrode with a high density of pinholes through it formed thereon, so that monomers for forming the desired polymer film can be diffused through the pinholes in the electrode and into the PEO salt.

Yet another object of the invention is to provide a method for synthesizing thin film electrically conductive polymers in situ on a solid PEO based-salt electrolyte disposed in a vacuum chamber, while a predetermined electric potential is applied between electrodes across the electrolyte thereby to effect electrochemical oxidation of monomers from a monomer vapor introduced into the vacuum chamber, and to grow a highly conductive polymer film of a selected thickness on the electrode.

Still another object of the invention is to provide a method for synthesizing thin film electrically conductive polymers, in situ, on a solid PEO-salt electrolyte, by first absorbing pyrrole monomer vapor in a PEO-salt, while maintaining it and an associated substrate cool enough to retain the pyrrole monomers in the PEO-salt for a sufficiently long period to permit a front electrode to then be formed on the PEO-salt. The front electrode thus formed need not be ultra-thin or porous. Subsequently, a thin film of polypyrrole, (or other conductive polymer of an absorbed monomer) can be electrochemically deposited on either the substrate or the front electrode.

Additional objects and advantages of the invention will become apparent to those skilled in the art from the description of it presented herein, considered in conjunction with the accompanying drawings.

SUMMARY OF THE INVENTION

In one preferred arrangement of the method of the invention a thin film of electrically conductive polymer is formed in situ on an ultra thin electrode disposed on a solid PEO-salt electrolyte. The solid electrolyte is precast onto a substrate having an electrode mounted on it. The substrate, electrolyte and ultra thin electrode are disposed in an evacuated chamber into which a suitable monomer vapor is introduced while a predetermined voltage is applied between the electrodes and across the solid electrolyte. The applied electric potential is effective to cause electrochemical oxidation of the monomers and causes a highly conductive polymer film of selected thickness to grow in situ on the ultra thin electrode, between it and the solid electrolyte.

DESCRIPTION OF THE DRAWINGS

FIG. 2C also illustrates the development of a thin film of polymer between that electrode and the solid electrolyte, according to the method of the invention.

DESCRIPTION OF THE PREFERRED EMBODIMENT

Figure 1:
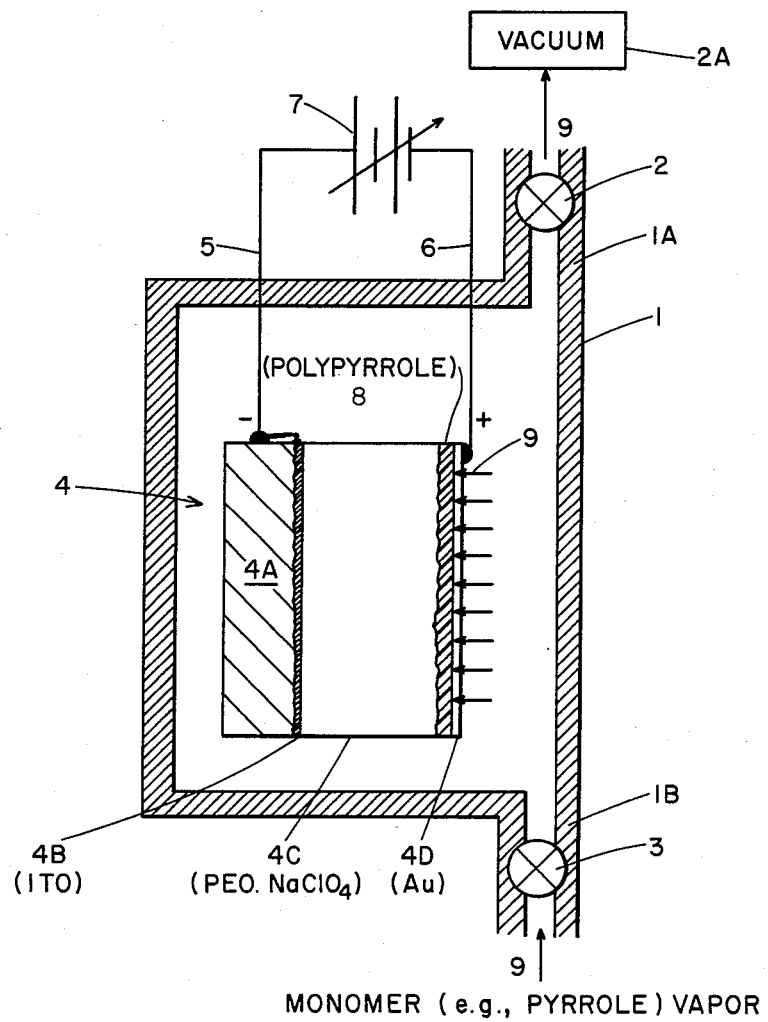
FIG. 1 is a schematic diagram showing a side plan view, in cross section, of an apparatus that is useful in practicing the method of the invention. The illustrated apparatus comprises an evacuated chamber having valve control means for regulating the introduction of a suitable monomer vapor into the chamber. There is disposed within the chamber an assembly comprising a substrate having an electrode thereon, a solid electrolyte, and an ultra thin electrode mounted on the other side of the solid electrolyte. A source of electric potential in the form of a battery or other suitable voltage source is shown electrically connected across the electrolyte, between the two electrodes. There is also depicted a thin polymer film disposed between the ultra thin electrode and the solid electrolyte, as such a polymer film is formed in the practice of the method of the invention.

There is shown in FIG. 1 an apparatus that is usable in practicing a preferred arrangement of the method of the invention. The illustrated apparatus comprises an evacuated chamber 1 having a first valve 2 that is suitably connected by associated conduit means 1A to a source of vacuum, such as a conventional vacuum pump, for maintaining a desired predetermined vacuum pressure within the chamber 1. A second valve 3 is disposed in another suitable conduit means 1B for controlling the introduction of a selected monomer vapor into the chamber 1. As will be more fully explained below, in describing the method steps of the invention, a sandwich type assembly 4 is mounted within the evacuated chamber and is electrically connected by conventional conductors 5 and 6 to a battery 7, or to some other suitable source of electric potential, if such an alternative source is desired.

The assembly 4 comprises a substrate 4A, which may be formed of either insulating or semiconducting material. In the preferred embodiment of the invention the substrate 4A comprises a sheet of glass coated with indium tin oxide (ITO) as an electrode 4B disposed on the surface of the substrate 4A. A solid electrolyte 4C, formed of a solution of high molecular weight poly (ethylene oxide) (PEO), complexed with at least one alkali salt, such as NaI, KI, KClO$_4$ or NaClO$_4$, is formed as a coating on the substrate and its electrode 4A-4B. In the most preferred arrangement of the disclosed method, a semi-transparent noble metal electrode 4D, which may be made of gold, platinum or other suitable noble metal, is vacuum evaporated onto the solid electrolyte 4C to define a thin film electrode (4D) that has a high density of pinholes through it. The thickness of the electrode film 4D should be in the range of about 50–200 Angstroms to assure a suitable density of pinholes through it, for practicing the preferred arrangement of the present invention. Monomers can diffuse through those pinholes into the PEO-salt electrolyte as the method of the invention is practiced. The electrode 4D is electrically connected by conductor 6 to a battery 7, or other suitable source of electric current. Battery 7 is made, or chosen to be, effective to apply a desired electric potential between the ITO electrode 4B and the semi-transparent noble metal electrode 4D, and across the solid electrolyte 4C.

In practicing this arrangement of the method of the invention, after a suitable vacuum has been drawn on the chamber 1 by connecting it through valve 2 to the illustrated vacuum source, 2A which may be a suitable conventional pump, a selected monomer vapor, such as pyrrole monomer vapor, is introduced through valve 3 into chamber 1. An electric potential is simultaneously applied across the electrolyte 4C between the ITO electrode 4B and the transparent noble metal electrode 4D to hold the latter electrode at a positive potential relative to the ITO electrode 4B. That potential is effective to cause electrochemical oxidation of the monomers and to grow a highly conductive polymer film 8, of a selected thickness, on the transparent thin electrode 4D, between it and the solid electrolyte 4C. The monomer vapors are designated with the numeral 9 (and the associated arrow) in FIG. 1, and may be provided from any suitable source of such a vapor.

Figure 3:
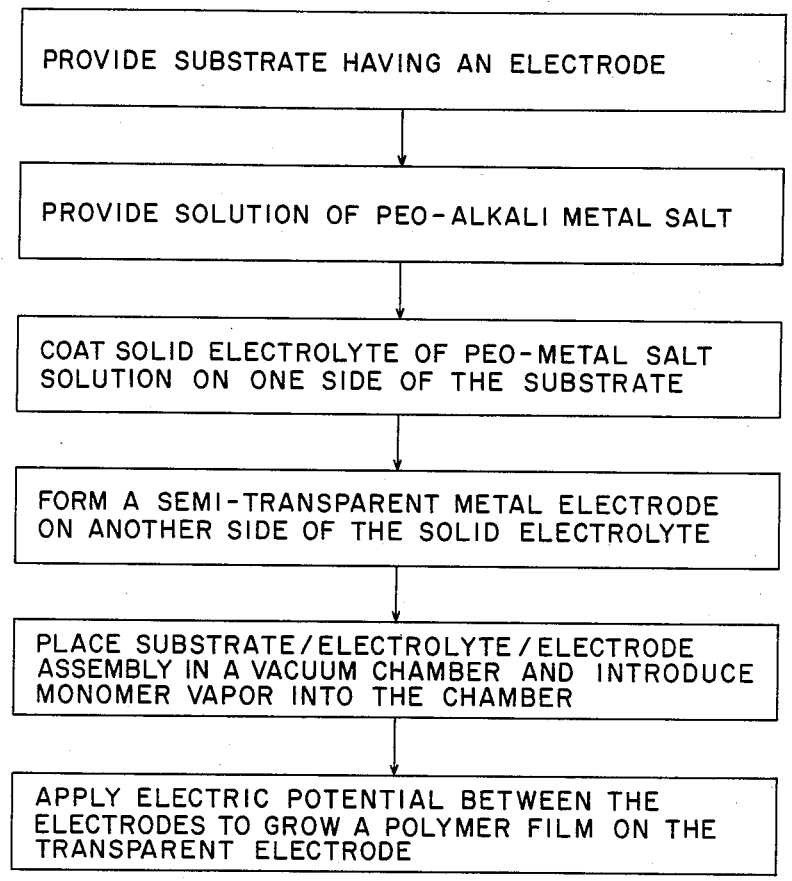
FIG. 3 is a flow chart showing the steps of a preferred arrangement of the method of the invention.

Now that the apparatus 1 shown in FIG. 1 is generally understood, reference is made to FIG. 3 of the drawing to describe in more detail a preferred arrangement of the steps of the present invention. According to this preferred arrangement of the method of the invention for synthesizing electrically conducting polymers from a solvent-free solid polymer electrolyte, one first provides a substrate, such as the substrate 4A shown in FIG. 1, with an electrode thereon, such as the electrode 4B. Next one provides a solution of high molecular weight poly (ethylene oxide) complexed with at least one alkali metal salt. In the most preferred embodiment of the invention the alkali metal salt used to complex the PEO is sodium perchlorate (NaClO$_4$), but other metal salts or a combination of such salts may be used in making the PEO complexed salt solution with a conventional solvent, such as methanol. A thin film of the selected salt is solution coated, or precast, onto the substrate and/or its associated electrode (4B), then the solvent in the solution is removed from it by heating the solution coated thin film electrolyte 4C in a vacuum. For example, it has been found that by heating such a precast film for about one hour, at about 100° C., in vacuum a sufficiently complete depletion of the solvent is attained. Next a semi-transparent noble metal electrode film, having a desired maximum predetermined thickness, is formed on the PEO-salt film electrolyte in order to define a thin film transparent electrode that has a high density of pinholes through it. In the most preferred method of the invention the transparent noble metal electrode is formed of gold, but platinum or other suitable noble metals may be used to form that electrode in alternative arrangements of the invention.

Figure 2:
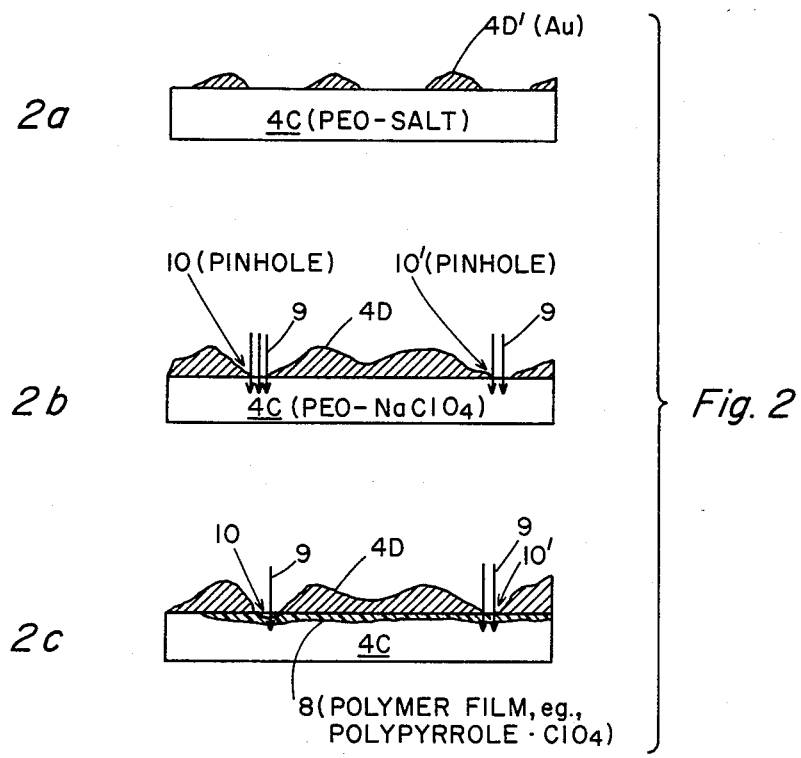
FIG. 2 is a three part schematic illustration of the formation of an ultra thin electrode having a high density of pinholes through it, and being disposed on a solid electrolyte according to one step of the method of the invention.

A characteristic feature of the transparent electrode 4D that is used in the most preferred arrangement of the method of the invention is that it must have a sufficiently high density of pinholes through it to enable monomers from the introduced monomer vapor (9) to readily diffuse through those pinholes and into the solid electrolyte (4C). There is shown in FIG. 2 of the drawing three separate schematic illustrations of a portion of a PEO-NaClO$_4$ solid electrolyte on which gold has been vapor deposited. In FIG. 2A the deposited gold is shown as small hills or embossments that are disconnected from one another. According to the vapor deposition process that is used in practicing this step of the method of the invention, such a largely disconnected thin film of gold would not be suitable for practicing the method of the invention. Instead, the vapor deposition process is continued, according to the preferred method, until a desired predetermined maximum thickness of the gold electrode, as illustrated schematically in FIG. 2B is obtained. As can be seen in FIG. 2B, that desired predetermined maximum thickness forms a substantially continuous noble metal electrode through which a high density of pinholes, illustrated e.g., by the pinholes 10, 10', etc. are formed. Thus, the monomers (9) illustrated by arrows, can enter through the pinholes in the transparent film 4D and enter the solid electrolyte 4C.

There is shown in FIG. 2C a subsequent stage of development of a thin film of polymer 8, on the side of the transparent electrode 4D juxtaposed with the solid electrolyte 4C.

Continuing with the description of the most preferred arrangement of the method of the invention, after the thin film of transparent noble metal is formed on the solid electrolyte by being evaporated thereon, an electric potential is applied across the electrodes 4B (ITO) and 4D (Au) to hold the thin transparent film electrode 4D at a desired positive potential relative to the other electrode (4B) on the substrate 4A. It has been found that if the positive potential on electrode 4D is held at 2.5 volts or more, a suitably controlled rate of growth of the polymer film (8) is afforded. This applied electric potential effects electrochemical oxidation of the polymer monomers 9 that are introduced under vacuum pressure into the chamber 1, thus causing a highly conductive polymer film 8 to grow on the transparent electrode 4D. In the preferred form of the invention, the monomer vapor 9 comprises a vapor of pyrrole monomers, thus, the resultant highly conductive polymer film grown on the gold electrode 4D comprises a polypyrrole film. Also in this preferred arrangement of the method of the invention the metal salt used to complex the PEO (4C) comprises NaClO$_4$ but, as mentioned above, could alternatively, or in further combination, comprise a metal salt taken from the group including sodium perchlorate, NaI, or KI. The salt concentration within the PEO-salt film is given as a stoichiometric ratio of oxygen/alkali metal cation (e.g., Na$^+$) equal to about 8/1, in this arrangement of the method of the invention.

The basic method steps of the preferred arrangement of the invention are set forth in FIG. 3 of the drawing. It should be recognized that various alternative embodiments and further modifications of the basic method of the invention can be practiced without departing from the true scope of the invention, which is defined in the claims appended hereto. Thus, in one modification of the invention the transparent film of noble metal evaporated onto the PEO NaClO$_4$ film comprises gold that is deposited at a rate of thickness development of about 2 Angstroms per second, in order to produce the desired maximum predetermined thickness of the gold electrode 4D. In the most preferred arrangement of the invention that desired maximum predetermined thickness of the transparent noble metal electrode 4D is about 200 Angstroms, thus as explained above with reference to FIG. 2, the transparent thin electrode is formed with a high density of pinholes maintained through it to enable it to function in the manner described above. In other arrangements, the desired thickness of the transparent electrode can be in the range of about 50-200 Angstroms as was pointed out above.

Also in the most preferred arrangement of the method of the invention the voltage applied from the battery 7 or from some other suitable source, to the electrodes 4B and 4D is connected to result in a positive electric potential at the electrode 4D, and is made to comprise more than 2.5 volts as applied between those electrodes and across the cast film 4C of PEO-NaClO$_4$. When the monomer 9, used to practice the invention, is pyrrole, the positive potential at electrode 4D should be at least 2.5 volts. The thickness of the solid electrolyte film 4C is made to be in the range of 0.1-10 umin practicing the most preferred method arrangement of the invention, and the selected high molecular weight of PEO in the solution that is used to form the solid electrolyte 4C is made to be in the range of 3400 to 600,000.

A preferred method of forming the thin film of solid electrolyte on the substrate 4A is by solution casting the PEO-salt solution onto the transparent counter electrode 4B formed of ITO on the glass substrate 4A. Also in the most preferred method sequence of the method of the invention the PEO-salt film thus formed on the substrate 4A is made in the range of approximately 0.1 to 10.0 microns thick, in a generally uniform layer.

In an alternative arrangement of the method of the invention PEO polymerization is performed without using an electrode having pinholes through it. In this alternative method, a suitable monomer vapor, such as pyrrole monomer vapor (9, as shown in FIG. 1) is first absorbed into a PEO-salt (4C), which may be solution coated onto a substrate (4A-4B), prior to the deposition, or other formation, of a front electrode, such as the electrode 4D, shown in FIG. 1, on the PEO-salt. The PEO-salt (and if affixed, the substrate 4A-4B), is maintained cool enough to retain the monomers in the PEO-salt for a sufficiently long period to permit a front electrode (4D) to then be formed on the PEO-salt. It is important to note that in this arrangement of the method the monomers need not pass through the front electrode, so it can be made quite thick and non-porous, i.e. without pinholes through it. The final step in this arrangement of the method is to electrochemically deposit a polymer film on either the substrate (4A-4B) or the front electrode 4D by applying a suitable electric potential to these components from the battery 7, or from another suitable source of current. If the monomer absorbed in the PEO-salt is pyrrole, for example, a film of polypyrrole will be formed adjacent to the front electrode if a positive voltage of 2.5 volts or more, is applied to that electrode.

I claim:
1. A method of synthesizing an electrically conductive polymer from a solvent-free solid polymer electrolyte, comprising the steps of:
   a. providing a substrate with an electrode thereon,
   b. providing a solution of high molecular weight poly (ethylene oxide) (PEO) complexed with at least one alkali metal salt in a solvent,
   c. solution casting onto said substrate a thin film of said solution of PEO-salt and removing the solvent from said solution, d. forming a semi-transparent noble metal electrode film having a maximum predetermined thickness on the PEO salt film, thereby to define a thin film electrode that has a high density of pinholes through it, through which pinholes monomers can diffuse into said PEO-salt and through which pinholes photoelectrons can escape from the PEO-salt, e. placing the substrate with said PEO salt film and said noble metal film electrode in an evacuated chamber, and introducing a selected monomer vapor into the chamber, and f. applying an electric potential across said electrodes to hold the thin film electrode at a positive potential relative to the electrode on said substrate, thereby to effect electrochemical oxidation of said monomers and to grow a highly conducting polymer film of a selected thickness on one of said electrodes.

2. An invention as defined in claim 1 wherein said salt is taken from the group consisting of NaI, KI, KCLO$_4$, and NaClO$_4$, and wherein the solution cast PEO-salt film has a salt concentration given as a stoichiometric ratio of oxygen/Na$^-$ (or K$^-$) equal to about 8/1, and wherein said selected monomer vapor is pyrrole monomer vapor.

3. An invention as defined in claim 2 wherein said noble metal electrode is formed by vacuum evaporating a gold film onto the PEO-NaClO$_4$ film at a rate of thickness development of about 2 Angstroms per second, thereby to produce said maximum predetermined thickness of the transparent electrode.

4. An invention as defined in claim 3 wherein said maximum predetermined thickness is about 200 Angstroms, whereby a high density of pinholes is maintained through the transparent electrode film.

5. An invention as defined in claim 4 wherein said positive electric potential is made more than 2.5 volts as applied between said electrodes and across the PEO NaClO$_4$ cast film electrolyte.

6. An invention as defined in claim 5 wherein said selected thickness of the solid electrolyte film is made to be in the range of about 0.1 to 10 microns.

7. An invention as defined in claim 1 wherein the high molecular weight of PEO in said provided solution is in the range of 3400 to 600,000.

8. An invention as defined in claim 7 wherein at least one alkali metal salt is selected from the group consisting of NaI, KI, KClO$_4$ or NaCLO$_4$.

9. An invention as defined in claim 1 wherein said PEO-salt film on the substrate is made to be in the range of approximately 0.1 to 10 microns thick.

10. An invention as defined in claim 9 wherein said cast film of electrolyte is formed on the substrate by solution casting it onto a transparent counter electrode formed of ITO on glass as a substrate.

11. A method of synthesizing an electrically conductive polymer from a solvent-free solid polymer electrolyte, comprising the steps of:

a. providing a solution of high molecular weight poly(ethylene oxide) (PEO) complexed with at least one alkali metal salt in a solvent, b. solution casting a thin film of said solution into a predetermined form, and removing the solvent from said cast solution, c. placing the thin cast PEO-salt film in an evacuated chamber, and introducing a selected monomer vapor into the chamber to cause its monomers to be absorbed in the PEO-salt film, d. maintaining the PEO-salt cool enough to retain the monomers therein, while forming a substrate on one surface of the PEO-salt film and while forming a front electrode on another side of said film, and e. applying a suitable electric potential to said substrate and front electrode, thereby to effect electrochemical oxidation of said monomers and to grow a highly conductive polymer film of a selected thickness between said PEO-salt film and either the substrate or the front electrode.

12. An invention as defined in claim 11 wherein said substrate and said front electrode are formed on said PEO-salt film by being vapor deposited thereon.

13. An invention as defined in claim 11 wherein said front electrode is non-porous.

14. An invention as defined in claim 11 including a first step of providing a substrate and solution casting the PEO-salt on the substrate before the PEO-salt has said monomers absorbed in it, thereby modifying step d so that only a front electrode is formed on the PEO-salt while it and the substrate are maintained sufficiently cool to retain the monomers in the PEO-salt.

* * * * *